United States Patent
Petrus

(10) Patent No.: US 11,546,775 B2
(45) Date of Patent: Jan. 3, 2023

(54) DUAL NON-CONTIGUOUS CHANNEL ALLOCATION FOR RELIABLE COMMUNICATION

(71) Applicant: ARRIS Enterprises LLC, Suwanee, GA (US)

(72) Inventor: Paul Petrus, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 174 days.

(21) Appl. No.: 16/090,578

(22) PCT Filed: Mar. 25, 2017

(86) PCT No.: PCT/US2017/024195
§ 371 (c)(1),
(2) Date: Oct. 1, 2018

(87) PCT Pub. No.: WO2017/172544
PCT Pub. Date: Oct. 5, 2017

(65) Prior Publication Data
US 2020/0404508 A1     Dec. 24, 2020

Related U.S. Application Data

(60) Provisional application No. 62/316,382, filed on Mar. 31, 2016.

(51) Int. Cl.
*H04W 16/14* (2009.01)
*H04W 72/04* (2009.01)

(52) U.S. Cl.
CPC .......... *H04W 16/14* (2013.01); *H04W 72/04* (2013.01)

(58) Field of Classification Search
CPC ... H04W 16/14; H04W 72/04; H04W 72/005; H04W 12/06; H04W 4/008; H04W 4/025;
(Continued)

(56) References Cited

U.S. PATENT DOCUMENTS 10,499,426 B2 * 12/2019 Oh ................ H04W 72/0446
2008/0221951 A1    9/2008 Stan et al.
(Continued)

FOREIGN PATENT DOCUMENTS

CN       1753343 A     3/2006
CN     104737576 A     6/2015
(Continued)

OTHER PUBLICATIONS

Extended European Search Report, European Patent Application No. 17776364.6, dated Oct. 9, 2019.
(Continued)

*Primary Examiner* — Ian N Moore
*Assistant Examiner* — Rushil Parimal Sampat
(74) *Attorney, Agent, or Firm* — Steven Stupp; Stewart Wiener

(57) ABSTRACT

In order to facilitate communication in a shared-license-access band of frequencies, an electronic device (such as an electronic device that implements a spectrum allocation service) allocates, to a radio node in a set of radio nodes, at least a first channel and a second channel in unallocated channels in the shared-license-access band of frequencies. Note that the first channel and the second channel are noncontiguous in the shared-license-access band of frequencies. Then, the electronic device monitors for transmissions by a higher-priority user than the set of radio nodes in the shared-license-access band of frequencies. When the transmissions are detected in the first channel, the electronic device instructs the radio node to discontinue use of the first channel, where allocation of at least the second channel allows uninterrupted communication by the radio node in the shared-license-access band of frequencies.

20 Claims, 7 Drawing Sheets

(58) Field of Classification Search
CPC ..... H04W 4/80; H04W 64/003; H04W 72/00; H04W 76/30
See application file for complete search history.

(56) References Cited

U.S. PATENT DOCUMENTS

| | | | |
|---|---|---|---|
| 2013/0294356 A1* | 11/2013 | Bala | H04W 72/0453 370/329 |
| 2014/0011509 A1 | 1/2014 | Markwart | |
| 2014/0080530 A1 | 3/2014 | Lee et al. | |
| 2014/0376400 A1* | 12/2014 | Kanamarlapudi | H04W 28/0273 370/253 |
| 2015/0092708 A1* | 4/2015 | Su | H04W 76/16 370/329 |
| 2015/0296484 A1* | 10/2015 | Ekberg | H04W 64/003 370/329 |

FOREIGN PATENT DOCUMENTS

| | | |
|---|---|---|
| CN | 104885545 A | 9/2015 |
| WO | 2014/078676 A2 | 5/2014 |
| WO | WO 2014/078676 | 5/2014 |
| WO | 2015/195260 A1 | 12/2015 |
| WO | WO 2015/195260 | 12/2015 |
| WO | 2016/048475 A1 | 3/2016 |
| WO | WO 2016/048475 | 3/2016 |

OTHER PUBLICATIONS

"First Office Action for Chinese Application No. 201780026732.X, dated Jan. 4, 2021".
Extended European Search Report, Re: U.S. Appl. No. 17/776,364, dated Oct. 9, 2019.

* cited by examiner

DUAL NON-CONTIGUOUS CHANNEL ALLOCATION FOR RELIABLE COMMUNICATION

CROSS REFERENCE TO RELATED APPLICATIONS

This application claims priority under 35 U.S.C. 371 to International Patent No. PCT/US2017/024195, as filed on Mar. 25, 2017, which claims priority to U.S. Provisional Application Ser. No. 62/316,382, as filed on Mar. 31, 2016, the contents of both which are herein incorporated by reference.

FIELD

The described embodiments relate to techniques for communicating information among electronic devices. In particular, the described embodiments relate to techniques for allocating channels in a shared-license-access band of frequencies to facilitate uninterrupted communication when transmissions by a higher-priority user are present.

RELATED ART

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

While many electronic devices communicate with each other via large networks owned by a network operator, small-scale networks associated with entities (such as a company or an organization) are increasingly common. In principle, the small-scale network complements the service offered by the network operator and can offer improved communication performance, such as in a particular venue or environment. In practice, the communication performance of small-scale networks (and large networks) is often constrained by resources, such as bandwidth in a shared communication channel.

In order to address these constraints, additional bands of frequencies are being considered for use by large networks and small-scale networks. For example, one proposal involves the use of a shared-license-access band of frequencies near 3.5 GHz. In particular, it has been proposed that 150 MHz of bandwidth between 3.55 GHz and 3.7 GHz be used for general-purpose communication.

However, this band of frequencies falls within a band of frequencies between 3.4 and 3.8 GHz that is infrequently used by higher-priority users, such as by the U.S. Government (and, in particular, the U.S. Navy) and/or for satellite services. If transmissions associated with a higher-priority user occur in a channel in the shared-license-access band of frequencies, then other users are required to discontinue using this channel to reduce or eliminate interference.

This requirement may disrupt communication in small-scale networks. In particular, the requirement to discontinue use of channels when transmissions by the higher-priority users are present may degrade the communication performance (such as lost connections or reduce data rates), which can adversely impact the user experience when communicating via small-scale networks.

SUMMARY

The described embodiments relate to an electronic device that facilitates communication in a shared-license-access band of frequencies. This electronic device includes an interface circuit that, during operation, communicates with a set of radio nodes. Moreover, during operation the electronic device accesses predefined channel allocations in the shared-license-access band of frequencies, where the shared-license-access band of frequencies is shared by the set of radio nodes with another user that has higher priority than the set of radio nodes. Then, the electronic device allocates, to a radio node in the set of radio nodes, at least a first channel and a second channel in unallocated channels in the shared-license-access band of frequencies based on the predefined channel allocations, where the first channel and the second channel are noncontiguous in the shared-license-access band of frequencies. Next, the electronic device monitors for transmissions by the higher-priority user in the shared-license-access band of frequencies. When the transmissions are detected in the first channel, the electronic device instructs the radio node to discontinue use of the first channel, where allocation of at least the second channel allows uninterrupted communication by the radio node in the shared-license-access band of frequencies.

Note that the first channel and the second channel may be as far apart as is possible in the unallocated channels.

In some embodiments, the radio node communicates using a single carrier frequency and, at a given time, the radio node transmits frames using one of the first channel and the second channel. In these embodiments, different pairs of channels may be allocated to each of the set of radio nodes. Alternatively, the first channel and the second channel may be allocated to the set of radio nodes. Furthermore, when the transmissions are detected, the electronic device may instruct the set of radio nodes to discontinue use of the first channel.

However, in some embodiments the radio node communicates using multiple carrier frequencies and the radio node simultaneously transmits frames using the first channel and the second channel.

Moreover, the set of radio nodes may communicate frames using: Long Term Evolution (LTE) communication protocol, and/or an IEEE 802.11 communication protocol. For example, when the communication protocol is the LTE communication protocol, the second channel may be a control channel. Alternatively, when the communication protocol is the IEEE 802.11 communication protocol, the second channel may be a primary channel.

Furthermore, the electronic device may include: a processor; and a memory, coupled to the processor, which stores a program module that, during operation, is executed by the processor. The program module may include instructions for at least some of the operations performed by the electronic device.

Another embodiment provides a computer-program product for use with the electronic device. This computer-program product includes instructions for at least some of the operations performed by the electronic device.

Another embodiment provides a method. This method includes at least some of the operations performed by the electronic device.

Another embodiment provides the radio node. This radio node may include a second interface circuit that, during operation, communicates with the electronic device. Moreover, during operation the radio node receives, from the electronic device, allocation of at least the first channel and the second channel in the shared-license-access band of frequencies, where the radio node is included in the set of radio nodes. Note that the first channel and the second channel are noncontiguous in the shared-license-access band of frequencies, and the shared-license-access band of frequencies is shared by the set of radio nodes with the other user that has higher priority than the set of radio nodes. Then, the radio node receives, from the electronic device, the instruction to discontinue use of the first channel when the transmissions by the higher-priority user in the first channel in the shared-license-access band of frequencies are present. Next, the radio node maintains uninterrupted communication in the shared-license-access band of frequencies by using the second channel.

Furthermore, when the radio node communicates using a single carrier frequency and, at a given time, the radio node transmits frames using one of the first channel and the second channel, a subset of the set of radio nodes may release the first channel immediately in response to the instruction while a remainder of the set of radio nodes may release the first channel within a time period. During the time period and when the radio node is in the subset of the set of radio node, the radio node may receive first instructions for a first forced handover, to one of the remainder of the set of radio nodes, of communication with another electronic device. Alternatively, during the time period and when the radio node is in the remainder of the set of radio node, the radio node may receive second instructions for a second forced handover, from another radio node in the subset of the set of radio nodes, of communication with an additional portable electronic device. Note that the first instructions or the second instructions may be received from a controller and/or the other radio node.

Additionally, the subset of the set of radio nodes and the remainder of the set of radio nodes may be: predefined by the controller; determined using distributed control based on predefined groups of radio nodes in the set of radio nodes; and/or determined using distributed control by the set of radio nodes.

In some embodiments, the radio node includes: a processor; and a memory, coupled to the processor, which stores a program module that, during operation, is executed by the processor. The program module may include instructions for at least some of the operations performed by the radio node.

Another embodiment provides a computer-program product for use with the radio node. This computer-program product includes instructions for at least some of the operations performed by the radio node.

Another embodiment provides a method. This method includes at least some of the operations performed by the radio node.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
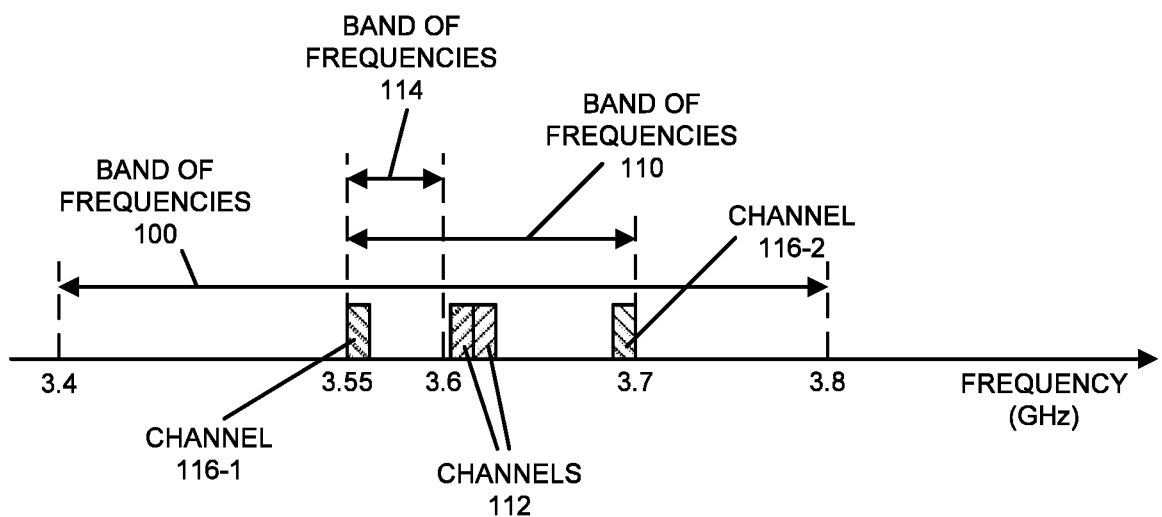
FIG. 1 is a drawing illustrating channels in a shared-access-license band of frequencies in accordance with an embodiment of the present disclosure.

In order to facilitate communication in a shared-license-access band of frequencies, an electronic device (such as an electronic device that implements a spectrum allocation service) allocates, to a radio node in a set of radio nodes, at least a first channel and a second channel in unallocated channels in the shared-license-access band of frequencies. Note that the first channel and the second channel are noncontiguous in the shared-license-access band of frequencies. Then, the electronic device monitors for transmissions by a higher-priority user than the set of radio nodes in the shared-license-access band of frequencies. When the transmissions are detected in the first channel, the electronic device instructs the radio node to discontinue use of the first channel, where allocation of at least the second channel allows uninterrupted communication by the radio node in the shared-license-access band of frequencies.

By facilitating uninterrupted communication by the radio node in the shared-license-access band of frequencies, this communication technique may provide more reliable communication in the shared-license-access band of frequencies. This capability may allow the shared-license-access band of frequencies to be used by a larger set of users than the higher-priority user. Consequently, the communication technique may facilitate dynamic and efficient allocation of this shared resource, and may facilitate improved communication performance during communication in the shared-license-access band of frequencies. In turn, the improved communication performance may improve the user experience when using additional electronic devices that communicate with the set of radio nodes via the shared-license-access band of frequencies, and thus may improve customer satisfaction and retention.

In the discussion that follows, the set of radio nodes communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Long Term Evolution (LTE) is used as an illustrative example. However, a wide variety of communication protocols (such as Wi-Fi, cellular or others) may be used.

A cellular-telephone network may include base stations (and associated cell towers) that implement so-called 'macro cells.' These macro cells may facilitate communication with hundreds of users (such as hundreds of cellular telephones) over distances of kilometers. In general, the positioning of the cell towers (and the antennas) is carefully designed and optimized by a network operator to maximize the performance of the cellular-telephone network (such as the throughput, the capacity, the block error rate, etc.) and to reduce cross-talk or interference between the signals transmitted by different cell towers and/or different macro cells.

However, there are often gaps in the coverage offered by macro cells. In particular, gaps in radio coverage can occur in the interior of a building because the transmission in a macro cell may not be powerful enough to penetrate the building. Consequently, some users operate local transceivers that provide short-range communication in the cellular-telephone network. These so-called 'femto cells' provide short-range communication (e.g., up to 10 m) for a few individuals.

In addition, larger entities or organizations (such as those with 50-60 users) may operate local transceivers that provide communication in the cellular-telephone network over a range of 100 m. This intermediate-range coverage in the cellular-telephone network is typically referred to as a 'small cell.'

Recently, entities have established or hosted small cells based on a data communication protocol, such as LTE. (However, as noted previously, a wide variety of communication techniques or protocols may be used to implement a small cell, such as those used in cellular systems or to communicate with a radio-access network and are not limited to LTE. For example, in some embodiments the described communication technique is used in conjunction with Wi-Fi.) These small cells are examples of enterprise-hosted networks or EHNs (which are sometimes referred to as 'neutral-host networks'), i.e., networks that are hosted by entities other than a network operator (such as a cellular-telephone carrier).

In principle, a small cell that implements an LTE network can allow an entity (such as a company or an enterprise) to provide a wide variety of services. However, one challenge is how to obtain sufficient resources (such as sufficient bandwidth in a shared communication channel) to provide high-quality communication performance, especially when there is concurrent communication with multiple electronic devices.

As noted previously, in order to address this constraint, additional bands of frequencies are being considered for use by macro cells and small-scale networks. For example, one proposal involves the use of a shared-license-access band of frequencies near 3.5 GHz in the U.S. This shared-license-access band of frequencies may have three tiers of access, including incumbent users, Priority Access Licensees (PALS) and General Authorized Access (GAA) operators. In particular, as shown in FIG. 1, which presents a drawing illustrating an example of channels in a shared-access-license band of frequencies 110 in accordance with some embodiments, it has been proposed that 150 MHz of bandwidth between 3.55 GHz and 3.7 GHz be used by GAA operators (such as operators of small-cell networks) for general-purpose communication.

However, this band of frequencies falls within a band of frequencies 100 between 3.4 and 3.8 GHz that is infrequently used by higher-priority users (who are sometimes referred to as 'incumbents'), such as by the U.S. Government (and, in particular, the U.S. Navy) and/or for fixed satellite services. For example, when transmissions by a higher-priority user occur, they can occupy or occur over 8-9 MHz, which corresponds to one or two adjacent or contiguous channels (such as channels 112). If transmissions associated with a higher-priority user occur in a particular channel in the shared-license-access band of frequencies, then other users are required to discontinue using this channel to reduce or eliminate interference.

This requirement may disrupt communication in small-scale networks. In particular, the requirement to discontinue use of channels when transmissions by the higher-priority users are present may degrade the communication performance (such as lost connections or reduce data rates), which can adversely impact the user experience when communicating via small-scale networks.

In addition, at least some of the channels in the shared-license-access band of frequencies in different regions (such as in a census track with at least 5000 people) are often auctioned off to network operators as PALs. In particular, a band of frequencies 114 between 3.55 and 3.6 MHz may be available to PALs. Consequently, the channels in the shared-license-access band of frequencies 110 that are available in a particular venue or environment (such as a building) can vary with time.

In order to address these challenges, a communication technique is used to dynamically allocate the available channels in band of frequencies 110 so that transmissions by a higher-priority user are less likely to or do not interrupt communication (e.g., they do not result in lost connections). In particular, after eliminating any channels that are reserved to a PAL, a given radio node (such as an eNode-B or eNB) may be assigned at least a pair of non-contiguous channels from the remaining (unallocated) channels in the shared-license-access band of frequencies 110. This pair of channels (such as channels 116) may be positioned as far as possible from each other (in terms of frequency) in the shared-license-access band of frequencies 110. Consequently, if transmissions by a higher-priority user subsequently occur and the given radio node is instructed to discontinue using one of the pair of channels 116 (such as channel 116-1), the radio channel will likely still have channel 116-2 available to use for communication. Therefore, this communication technique may help ensure uninterrupted communication in the shared-license-access band of frequencies 110.

Figure 2:
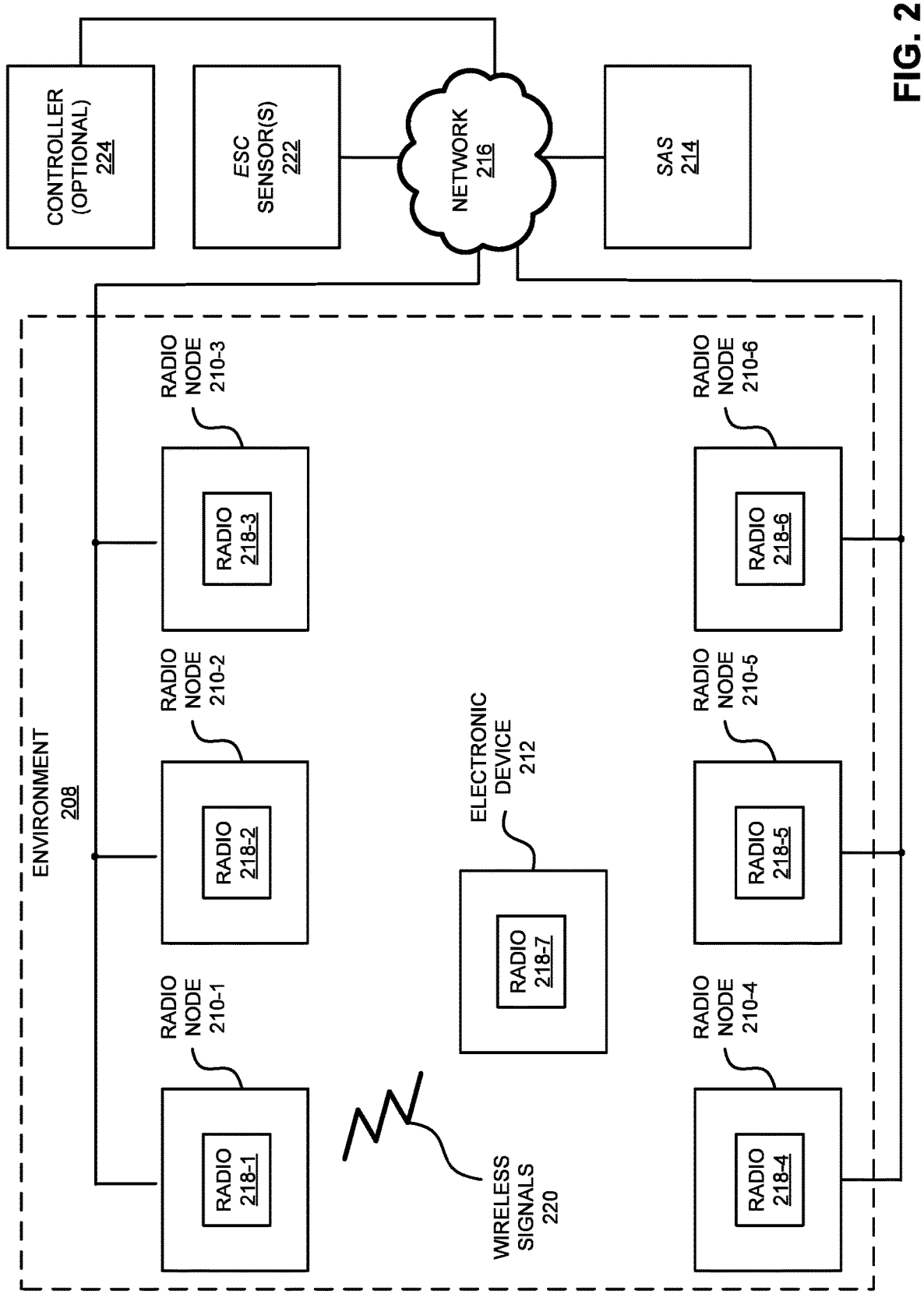
FIG. 2 is a block diagram illustrating electronic devices wirelessly communicating in accordance with an embodiment of the present disclosure.

We now further describe communication among electronic devices, including the radio node. FIG. 2 presents a block diagram illustrating a set of radio nodes 210 (such as a transceiver or an electronic device that is associated with a small cell that communicates using LTE, e.g., it may provide at least some of the functionality of an eNode-B, in a small-cell LTE network associated with or provided by an entity) and electronic device 212 (such as a portable electronic device, e.g., a cellular telephone or a smartphone) wirelessly communicating in an environment 208 (such as in or at a venue or a building associated with the entity) according to some embodiments. In particular, radio nodes 210 and electronic device 212 may wirelessly communicate while: transmitting advertising frames on wireless channels, detecting one another by scanning wireless channels, establishing connections (for example, by transmitting association or attach requests), and/or transmitting and receiving packets (which may include the association requests and/or additional information as payloads).

In addition, radio nodes 210 may communicate with spectrum allocation service (SAS) 214 (such as an electronic device that implements a spectrum allocation service) via network 216. In particular, network 216 may include the Internet (and, more generally, a wired network), and radio nodes 210 may access network 216 via a local area network. Thus, in general, communication between radio nodes 210 and spectrum allocation service 214 may involve a wired communication protocol, such as Ethernet.

Figure 7:
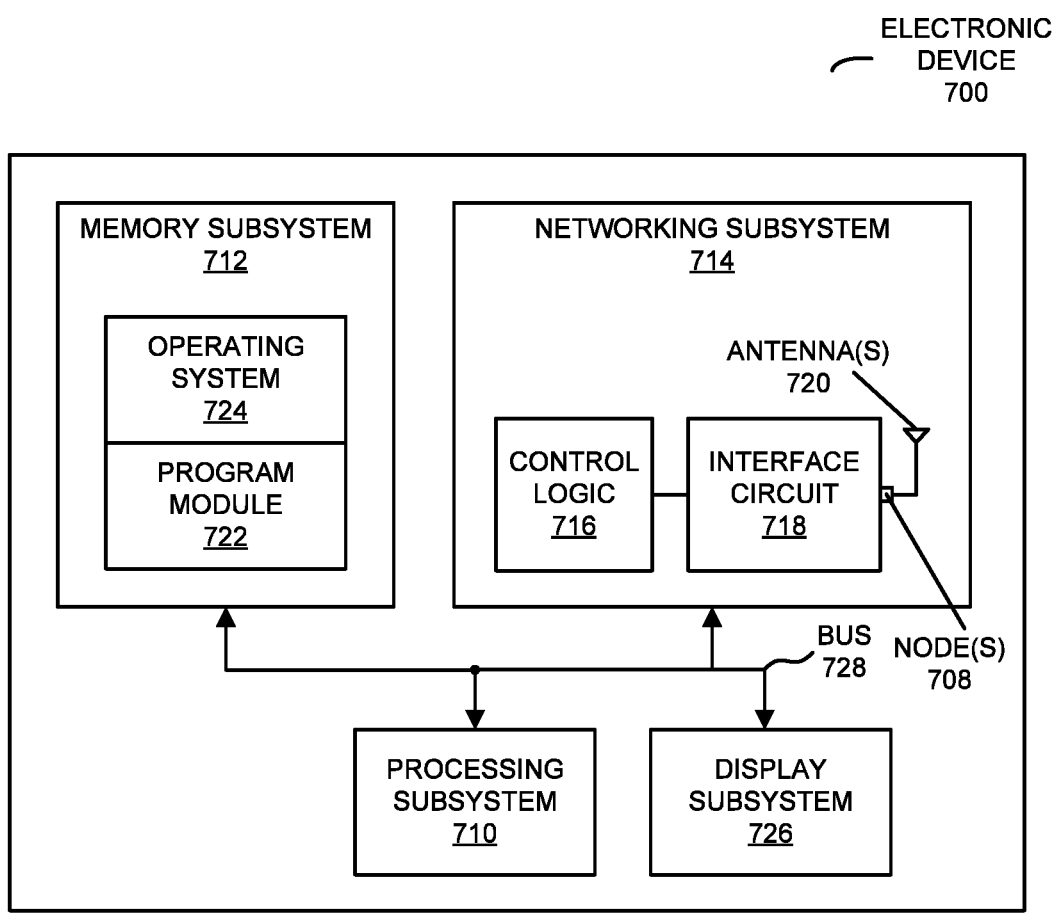
FIG. 7 is a block diagram illustrating an electronic device in accordance with an embodiment of the present disclosure.

As described further below with reference to FIG. 7, radio nodes 210, electronic device 212, and/or spectrum allocation service 214 may include subsystems, such as a networking subsystem, a memory subsystem and a processor subsystem. In addition, radio nodes 210 and electronic device 212 may include radios 218 in the networking subsystems. More generally, radio nodes 210 and electronic device 212 can include (or can be included within) any electronic devices with the networking subsystems that enable radio nodes 210 and electronic device 212 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 218 are shown in radio nodes 210 and electronic device 212, one or more of these instances may be different from the other instances of radios 218.

As can be seen in FIG. 2, wireless signals 220 (represented by a jagged line) are transmitted from radio 218-7 in electronic device 212. These wireless signals may be received by radio 218-1 in radio node 210-1. In particular, electronic device 212 may transmit packets. In turn, these packets may be received by radio node 210-1. Moreover, radio node 210-1 may allow electronic device 212 to communicate with other electronic devices, computers and/or servers (either locally or remotely via network 216 (such as the cellular-telephone network and/or the small-cell LTE network).

Note that the communication between radio nodes 210 and electronic device 212 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization).

As discussed further below with reference to FIGS. 2-6, in the communication technique spectrum allocation service 214 may dynamically allocate available channels in a shared-license-access band of frequencies (such as the shared-license-access band of frequencies 110 in FIG. 1). For example, spectrum allocation service 214 may access predefined channel allocations in the shared-license-access band of frequencies, which may be stored in local or remote memory. Then, spectrum allocation service 214 may allocate, to one or more of radio nodes 210 (such as radio node 210-1), at least a first channel (such as channel 116-1 in FIG. 1) and a second channel (such as channel 116-2 in FIG. 1) in unallocated or available channels in the shared-license-access band of frequencies based on the predefined channel allocations, where the first and second channels may be noncontiguous or non-adjacent in the shared-license-access band of frequencies. (However, in some embodiments, the first and second channels are contiguous or adjacent to each other in the shared-license-access band of frequencies.) Radio node 210-1 may use one or more of the first and second channels to communicate frames or packets with electronic device 212 (or additional electronic devices not shown).

Next, spectrum allocation service 214 may monitor for transmissions by a higher-priority user in the shared-license-access band of frequencies. For example, spectrum allocation service 214 may monitor for the transmissions using one or more environmental sensor capability (ESC) sensors 222. When the transmissions are detected in the first channel (or the second channel), spectrum allocation service 214 may instruct radio node 210-1 to discontinue use of the first channel (or the second channel). As noted previously, radio node 210-1 may use the second channel (or the first channel) to continue communication with electronic device 212 (i.e., to maintain connections), which may involve radio node 210-1 transitioning one or more connections from the first channel (or the second channel) to the second channel (or the first channel). Thus, dynamic allocation of at least the first and the second channels may allow or provide uninterrupted communication by radio node 210-1 in the shared-license-access band of frequencies.

In some embodiments, radio node 210-1 communicates using a single carrier frequency and, at a given time, radio node 210-1 transmits frames or packets using one of the first and the second channels. In these embodiments, different pairs of channels may be allocated to each of radio nodes 210. Alternatively, the first and the second channels may be allocated to radio nodes 210 (which is sometimes referred to as a 'co-channel deployment'). Furthermore, when the transmissions are detected by the one or more environmental sensor capability sensors 222, spectrum allocation service 214 may instruct radio nodes 210 to discontinue use of one of the first and the second channel, and radio nodes 210 may transition or handover connections to the remaining allocated channel (i.e., the first channel or the second channel).

However, in some embodiments radio node 210-1 communicates using multiple carrier frequencies and radio node 210-1 simultaneously transmits frames using the first and the second channels. This approach may avoid the need to ping pong back and forth between the first and the second channels in the event that the transmissions by the higher-priority user occur. Instead, radio node 210-1 can simply discontinue using the first or the second channel and may continue using the remaining allocated channel.

Note that if the remaining channel is a non-control channel (in the case of LTE), then the connection may be lost when radio node 210-1 transitions or hands over a connection when the transmissions by the higher-priority user occur. Similarly, if the remaining channel is not a primary channel (in the case of Wi-Fi), then the connection may be lost when radio node 210-1 transitions or hands over a connection when the transmissions by the higher-priority user occur. In order to prevent this problem, when possible (based on the unallocated or available channels in the shared-license-access band of frequencies) at least the first and the second channels allocated by spectrum allocation service 214 are both control channels or are both primary channels.

Figure 3:
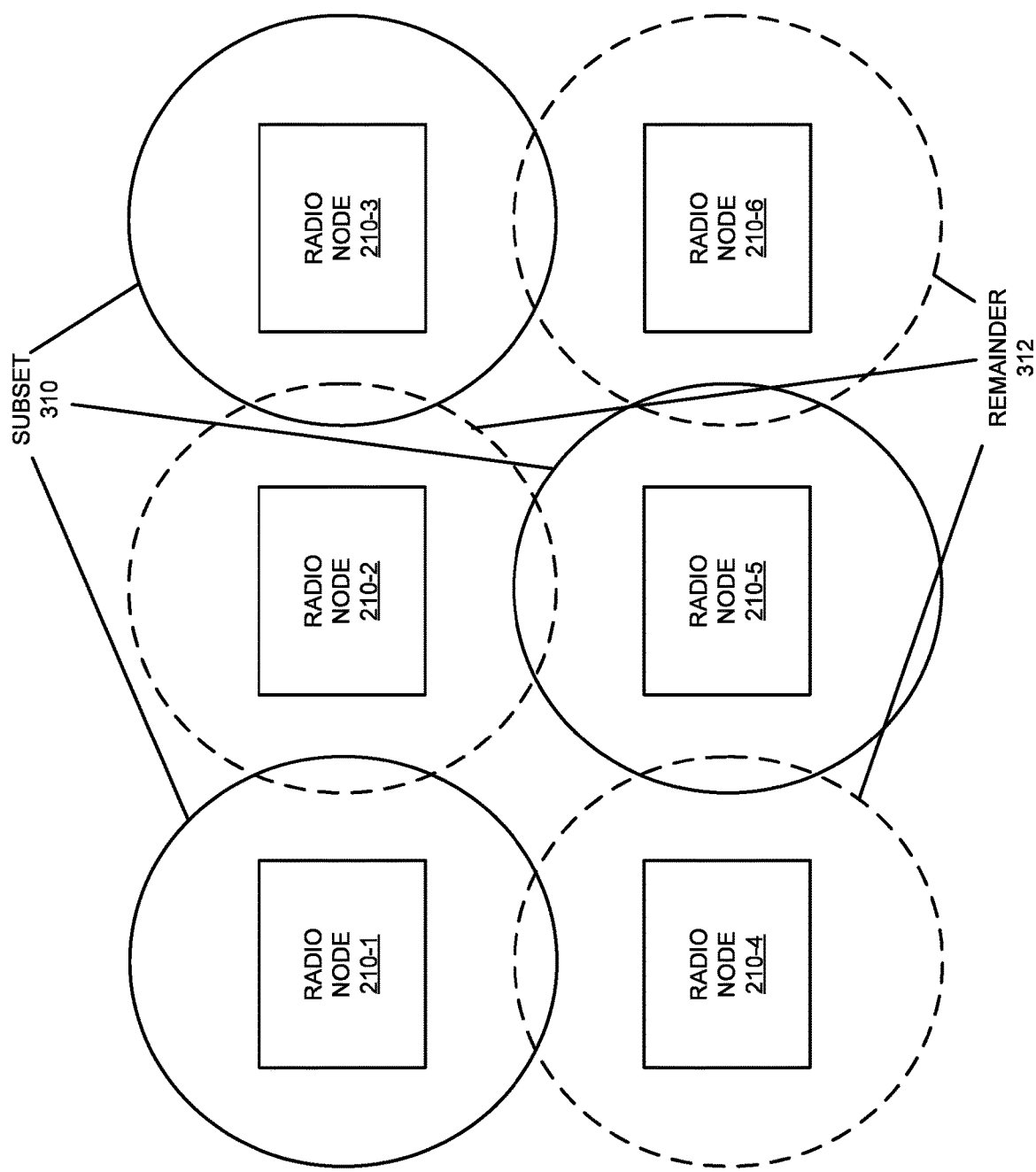
FIG. 3 is a drawing illustrating distributed control by a set of radio nodes in accordance with an embodiment of the present disclosure.

As shown in FIG. 3, which presents a drawing illustrating distributed control by a set of radio nodes, when radio node 210-1 communicates using a single carrier frequency and, at a given time, radio node 210-1 transmits frames using one of the first channel and the second channel (such as the first channel), a subset 310 of radio nodes 210 (such as radio nodes 210-1, 210-3 and 210-5) may release the first channel immediately in response to an instruction to discontinue using the first channel from spectrum allocation service 214. Moreover, a remainder 312 of radio nodes 210 (such as radio nodes 210-2, 210-4 and 210-6) may release the first channel within a time period (such as 1-2 min).

During the time period and when radio node 210-1 is subset 310, radio node 210-1 may receive first instructions for a first forced handover, to one of remainder 312, of communication with another electronic device (such as electronic device 212). Alternatively, during the time period and a radio node (such as radio node 210-2) is remainder 312, radio node 210-2 may receive second instructions for a second forced handover, from another radio node in subset 310 (such as radio node 210-3), of communication with an additional portable electronic device (such as electronic device 212). Note that the first instructions or the second instructions may be received from an optional controller 224 (FIG. 2) and/or the other one of radio nodes 210.

Additionally, subset 310 and remainder 312 may be: predefined by optional controller 224 in FIG. 2 (e.g., optional controller 224 may predefine groups of radio nodes in radio nodes 210); determined using distributed control based on the predefined groups of radio nodes; and/or self-defined or determined using distributed control by radio nodes 210 (e.g., subset 310 and remainder 312 may be determined dynamically based on network conditions or communication performance). For example, the predefined groups may be based on the locations or positions of radio nodes 210. Moreover, the distributed control may involve inter-radio-node communication via an X2 interface. Furthermore, the distributed self-definition or determination of subset 310 and remainder 312 may be based on automatic neighbor relation (ANR).

In some embodiments, in a co-channel deployment that is initially using the first channel, subset 310 handover their first connections to remainder 312 and then switch/adapt to the new channel (such as the second channel). Then, remainder 312 may handover their second connections as well as the first connections to subset 310 so that remainder 312 can switch/adapt to the new channel. Finally, subset 310 may handover the second connections back to remainder 312.

In order to avoid coverage holes during the handovers, at least some of radio nodes 210 may increase their transmit power during the handovers. For example, when subset 310 handover the first connections to remainder 312 and then switch to the second channel, remainder 312 may increase their transmit power until subset 210 is available to receive the first and the second connections.

Referring back to FIG. 2, in the described embodiments processing a packet or frame in radio nodes 210 and/or electronic device 212 includes: receiving wireless signals 220 with the packet or frame; decoding/extracting the packet or frame from received wireless signals 220 to acquire the packet or frame; and processing the packet or frame to determine information contained in the packet or frame (such as the access information for the small-cell LTE network).

Although we describe the network environment shown in FIG. 2 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 4:
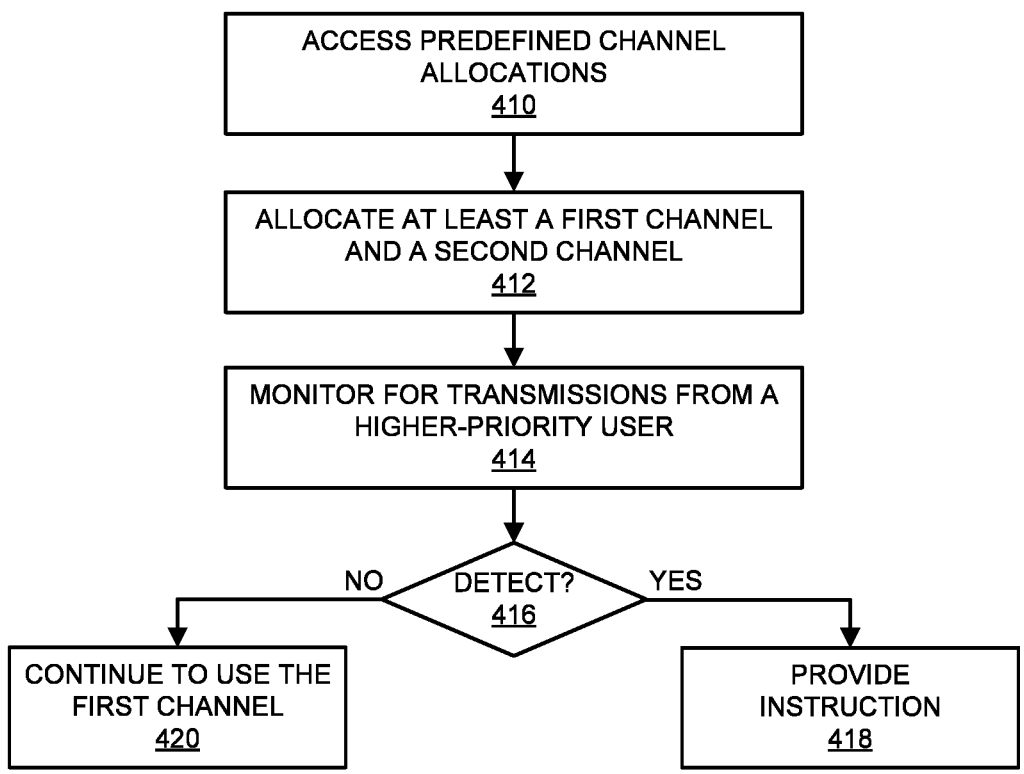
FIG. 4 is a flow diagram illustrating a method for allocating channels in a shared-access-license band of frequencies in accordance with an embodiment of the present disclosure.

We now describe embodiments of the method. FIG. 4 is a flow diagram illustrating an example of a method 400 for allocating channels in a shared-access-license band of frequencies, which may be performed by an electronic device, such as spectrum allocation service 214 in FIG. 2. During operation, the electronic device accesses predefined channel allocations (operation 410) in the shared-license-access band of frequencies, where the shared-license-access band of frequencies is shared by a set of radio nodes with another user that has higher priority than the set of radio nodes. Then, the electronic device allocates, to at least a radio node in the set of radio nodes, at least a first channel and a second channel (operation 412) in unallocated channels in the shared-license-access band of frequencies based on the predefined channel allocations, where the first channel and the second channel are noncontiguous in the shared-license-access band of frequencies.

Next, the electronic device monitors for transmissions by the higher-priority user (operation 414) in the shared-license-access band of frequencies. When the transmissions are detected in the first channel (operation 416), the electronic device instructs (operation 418) the radio node to discontinue use of the first channel, where allocation of at least the second channel allows uninterrupted communication by the radio node in the shared-license-access band of frequencies. Otherwise (operation 416), the radio node continues to use (operation 420) the first channel.

Figure 5:
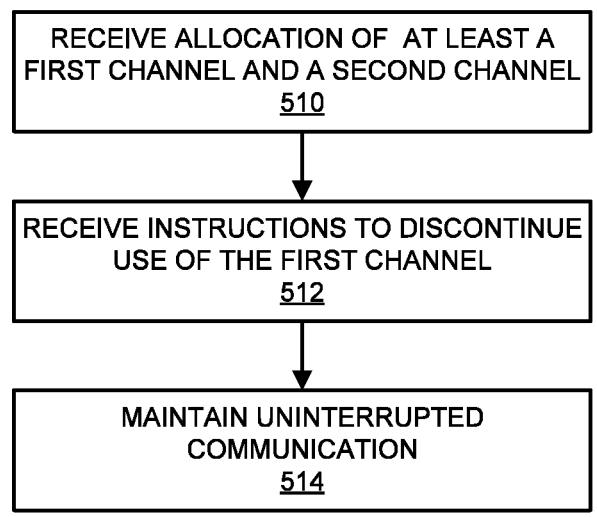
FIG. 5 is a flow diagram illustrating a method for communicating in a shared-access-license band of frequencies in accordance with an embodiment of the present disclosure.

FIG. 5 is a flow diagram illustrating an example of a method 500 for communicating in a shared-access-license band of frequencies, which may be performed by a radio node (such as radio node 210-1 in FIG. 2). During operation, the radio node receives, from the electronic device, allocation of at least the first channel and the second channel (operation 510) in the shared-license-access band of frequencies, where the radio node is included in the set of radio nodes. Note that the first channel and the second channel are noncontiguous in the shared-license-access band of frequencies, and the shared-license-access band of frequencies is shared by the set of radio nodes with the other user that has higher priority than the set of radio nodes. Then, the radio node receives, from the electronic device, the instruction to discontinue use of the first channel (operation 512) when the transmissions by the higher-priority user in the first channel in the shared-license-access band of frequencies are present. Next, the radio node maintains uninterrupted communication (operation 514) in the shared-license-access band of frequencies by using the second channel.

In some embodiments of methods 400 (FIG. 4) and/or 500, there may be additional or fewer operations. Furthermore, the order of the operations may be changed, and/or two or more operations may be combined into a single operation.

Figure 6:
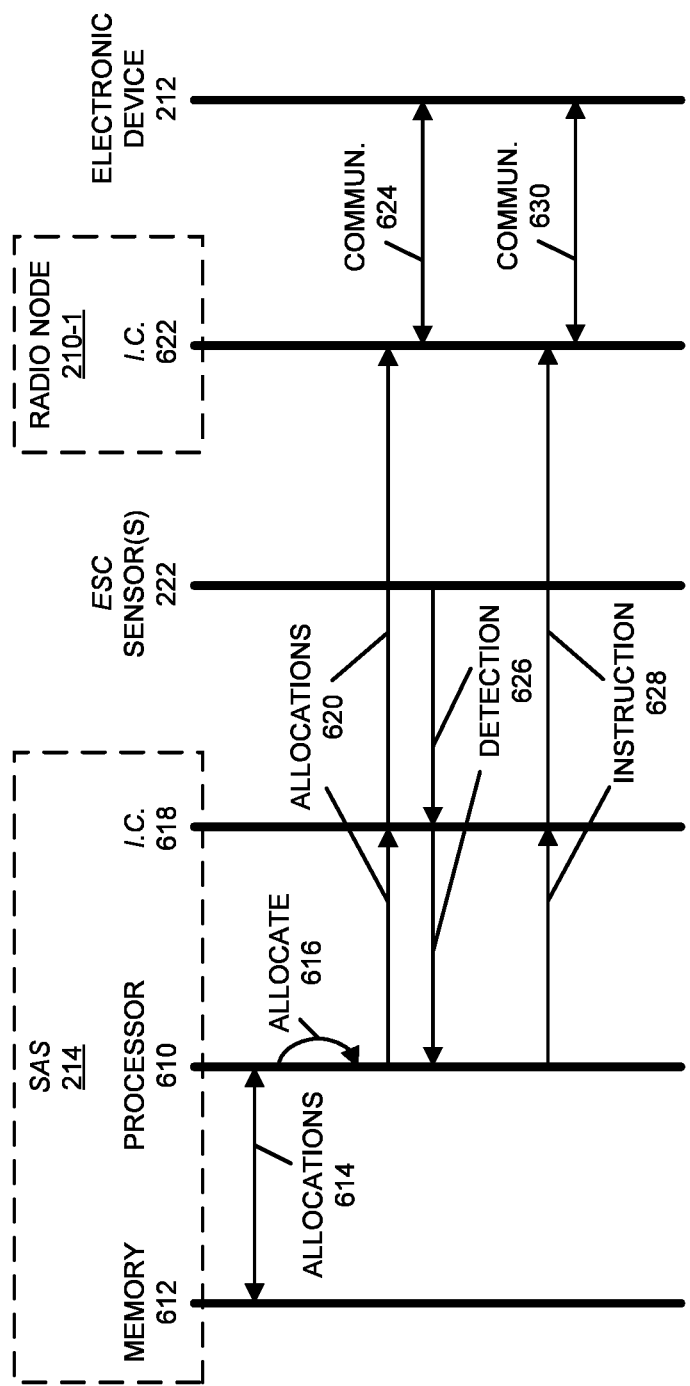
FIG. 6 is a drawing illustrating communication among the electronic devices in FIG. 2 in accordance with an embodiment of the present disclosure.

Embodiments of the communication technique are further illustrated in FIG. 6, which presents a drawing illustrating communication among radio node 210-1, electronic device 212-1, spectrum allocation service 214 and environmental sensor capability sensors 222 according to some embodiments. In particular, processor 610 in spectrum allocation service 214 may access, in memory 612, predefined channel allocations 614 in the shared-license-access band of frequencies. Then, processor 610 may allocate 616, to at least radio node 210-1 in the set of radio nodes, at least a first channel and a second channel in unallocated channels in the shared-license-access band of frequencies based on the predefined channel allocations 614.

Moreover, processor 610 may, via interface circuit (I.C.) 618, communicate allocations 620 to radio node 210-1. After receiving allocations 620, an interface circuit 622 in radio node 210-1 may communicate 624 with electronic device 212 based on allocations 620 (such as using the first channel).

Next, processor 610 may monitors for transmissions by the higher-priority user in the shared-license-access band of frequencies. For example, processor 610 may, via interface circuit 618, communicate with environmental sensor capability sensors 222. When environmental sensor capability sensors 222 detect 626 the transmissions in the first channel, processor 610 may, via interface 618, instructs 628 radio node 210-1 to discontinue use of the first channel. Furthermore, after receiving instructions 628, interface circuit 622 may communicate 630 with electronic device 212 based on allocations 620 (such as using the second channel). Note that allocation of at least the second channel (in addition to the first channel) may allow uninterrupted communication by radio node 210-1 in the shared-license-access band of frequencies with electronic device 212.

In an exemplary embodiment, the communication technique uses of a carrier aggregation feature to minimize service disruption in a shared licensed spectrum access deployment. The carrier aggregation in LTE may involve aggregating of more than one 10 or 20 MHz channels to increase the overall throughput of the link. While this communication technique can increase the peak throughput, it has another use in the shared licensed spectrum scenario. In particular, if an electronic device is operating in a 10 or 20 MHz slice of the spectrum, it is possible that access to this slice of spectrum can be denied by the spectrum allocation service in the event of the presence of an incumbent or higher-priority user (such as a navy ship, a fixed satellite service, etc.). When such an event occurs, a small-cell deployment using this slice of the spectrum will lose access and will be assigned a new channel. During this transition, service can be disrupted and this is a highly undesired end affect.

In order to address this issue, carrier aggregation can be used to alleviate the problem. For example, when a radio node (such as an eNode-B) has carrier aggregation capability, it may request two non-contiguous channels to the spectrum allocation service. Upon receiving grants, the radio node may operate using one or both channels. Whenever access is denied to one of the channels, the radio node can continue to work on the other channel. While the throughput may be degraded, but service is not disrupted.

In some embodiments, after one of the channels is taken away or revoked from a radio node, a new channel may be assigned to the radio node. Initially, the electronic devices attached to the radio nodes that are using the revoked channel get may be handed off to radio nodes that are using the other channel. However, after certain time period (such as 1, 10, 60 or 3600 s), using a load-balancing technique, a set of electronic devices may be handed back to a set of radio nodes that are using the reassigned or new channel. This approach may improve the spectral efficiency of the system, as well as providing performance improvements per user.

We now describe embodiments of an electronic device, which may perform at least some of the operations in the communication technique. For example, the electronic device may include a spectrum allocation service that performs the operations in FIG. 3, or a radio node associated with a small cell or a transceiver associated with a wireless local area network (which may perform counterparts to the operations in FIG. 4). FIG. 7 presents a block diagram illustrating an electronic device 700 in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a pad, which can be coupled to the one or more antennas 720. Thus, electronic device 700 may or may not include the one or more antennas 720. Note that nodes 708 may include one or more input nodes and/or one or more output nodes.) For example, networking subsystem 714 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an LTE communication protocol as an illustrative example, in other embodiments a wide variety of cellular-telephone communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 722, operating system 724 (such as a driver for interface circuit 718) or in firmware in interface circuit 718. Alternatively or additionally, at least some of the operations in the communication technique may be implemented in a physical layer, such as hardware in interface circuit 718.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit that is configured to communicate with a set of radio nodes, wherein the electronic device is configured to:
access predefined channel allocations in a shared-license-access band of frequencies, wherein the shared-license-access band of frequencies is shared by the set of radio nodes with another user that has higher priority than the set of radio nodes;
allocate, to a radio node in the set of radio nodes, at least a first channel and a second channel in unallocated channels in the shared-license-access band of frequencies based on the predefined channel allocations, wherein the first channel and the second channel are noncontiguous in the shared-license-access band of frequencies, and
wherein, when the radio node communicates using a Long Term Evolution (LTE) communication protocol, the first channel and the second channel are control channels, and, when the radio node communicates using an IEEE 802.11 communication protocol, the first channel and the second channel are primary channels;
monitor for transmissions by the higher-priority user in the shared-license-access band of frequencies; and
when the transmissions are detected in the first channel, instruct the radio node to discontinue use of the first channel, wherein allocation of at least the second channel allows uninterrupted communication by the radio node in the shared-license-access band of frequencies,
wherein a subset of the set of radio nodes releases the first channel immediately in response to the instruction while a remainder of the set of radio nodes release the first channel within a time period;
wherein, during the time period and when the radio node is in the subset of the set of radio node, the electronic device is configured to provide, to the radio node, first instructions for a first forced handover, to one of the remainder of the set of radio nodes, of communication with another electronic device; and
wherein, during the time period and when the radio node is in the remainder of the set of radio node, the electronic device is configured to provide, to the radio node, second instructions for a second forced handover, from another radio node in the subset of the set of radio nodes, of communication with an additional portable electronic device, the instructions being received from one of: a controller and the other radio node.

2. The electronic device of claim 1, wherein the first channel and the second channel are as far apart as is possible in the unallocated channels.

3. The electronic device of claim 1, wherein the radio node communicates using a single carrier frequency and, at a given time, the radio node transmits frames using one of the first channel and the second channel; and
wherein the uninterrupted communication involves a third handover from the first channel to the second channel.

4. The electronic device of claim 3, wherein different pairs of noncontiguous channels are allocated to each of the set of radio nodes.

5. The electronic device of claim 3, wherein the first channel and the second channel are allocated to the set of radio nodes.

6. The electronic device of claim 5, wherein, when the transmissions are detected, the electronic device is configured to instruct the set of radio nodes to discontinue use of the first channel.

7. The electronic device of claim 1, wherein the radio node communicates using multiple carrier frequencies and the radio node simultaneously transmits frames using the first channel and the second channel.

8. The electronic device of claim 1, wherein the set of radio nodes communicate frames using one of: the LTE communication protocol, and the IEEE 802.11 communication protocol.

9. A method for allocating channels in a shared-license-access band of frequencies, wherein the method comprises:
accessing predefined channel allocations in the shared-license-access band of frequencies, wherein the shared-license-access band of frequencies is shared by the set of radio nodes with another user that has higher priority than the set of radio nodes;
allocating, to a radio node in the set of radio nodes, at least a first channel and a second channel in unallocated channels in the shared-license-access band of frequencies based on the predefined channel allocations, wherein the first channel and the second channel are noncontiguous in the shared-license-access band of frequencies, and
wherein, when the radio node communicates using a Long Term Evolution (LTE) communication protocol, the first channel and the second channel are control channels, and, when the radio node communicates using an IEEE 802.11 communication protocol, the first channel and the second channel are primary channels;
monitoring for transmissions by the higher-priority user in the shared-license-access band of frequencies; and
when the transmissions are detected in the first channel, instructing the radio node to discontinue use of the first channel, wherein allocation of at least the second channel allows uninterrupted communication by the radio node in the shared-license-access band of frequencies,
wherein a subset of the set of radio nodes releases the first channel immediately in response to the instruction while a remainder of the set of radio nodes release the first channel within a time period;
wherein, during the time period and when the radio node is in the subset of the set of radio node, the electronic device is configured to provide, to the radio node, first instructions for a first forced handover, to one of the remainder of the set of radio nodes, of communication with another electronic device; and wherein, during the time period and when the radio node is in the remainder of the set of radio node, the electronic device is configured to provide, to the radio node, second instructions for a second forced handover, from another radio node in the subset of the set of radio nodes, of communication with an additional portable electronic device, the instructions being received from one of: a controller and the other radio node.

10. A radio node, comprising:

an interface circuit that is configured to communicate with an electronic device, wherein the radio node is configured to:

receive, from the electronic device, allocation of at least a first channel and a second channel in a shared-license-access band of frequencies, wherein the radio node is included in a set of radio nodes, wherein the first channel and the second channel are noncontiguous in the shared-license-access band of frequencies, wherein the shared-license-access band of frequencies is shared by the set of radio nodes with another user that has higher priority than the set of radio nodes, and wherein, when the radio node communicates using a Long Term Evolution (LTE) communication protocol, the first channel and the second channel are control channels, and, when the radio node communicates using an IEEE 802.11 communication protocol, the first channel and the second channel are primary channels;

receive, from the electronic device, an instruction to discontinue use of the first channel when transmissions by the higher-priority user in the first channel in the shared-license-access band of frequencies are present; and maintain uninterrupted communication in the shared-license-access band of frequencies by using the second channel, wherein a subset of the set of radio nodes releases the first channel immediately in response to the instruction while a remainder of the set of radio nodes release the first channel within a time period;

wherein, during the time period and when the radio node is in the subset of the set of radio node, the electronic device is configured to provide, to the radio node, first instructions for a first forced handover, to one of the remainder of the set of radio nodes, of communication with another electronic device; and wherein, during the time period and when the radio node is in the remainder of the set of radio node, the electronic device is configured to provide, to the radio node, second instructions for a second forced handover, from another radio node in the subset of the set of radio nodes, of communication with an additional portable electronic device, the instructions being received from one of: a controller and the other radio node.

11. The radio node of claim 10, wherein the radio node communicates using a single carrier frequency and, at a given time, the radio node transmits frames using one of the first channel and the second channel; and wherein the uninterrupted communication involves a third handover from the first channel to the second channel.

12. The radio node of claim 11, wherein different pairs of noncontiguous channels are allocated to each of the set of radio nodes.

13. The radio node of claim 11, wherein the first channel and the second channel are allocated to the set of radio nodes.

14. The radio node of claim 10, wherein the subset of the set of radio nodes and the remainder of the set of radio nodes are one of: predefined by the controller; determined using distributed control based on predefined groups of radio nodes in the set of radio nodes; and determined using distributed control by the set of radio nodes.

15. The radio node of claim 10, wherein the radio node communicates using multiple carrier frequencies and the radio node simultaneously transmits frames using the first channel and the second channel.

16. The radio node of claim 10, wherein the radio node communicates using a single carrier frequency and, at a given time, the radio node transmits frames using one of the first channel and the second channel;

wherein the uninterrupted communication involves a third handover from the first channel to the second channel; and wherein the radio node is configured to increase a transmit power during the third handover.

17. The method of claim 9, wherein the radio node communicates using multiple carrier frequencies and the radio node simultaneously transmits frames using the first channel and the second channel.

18. The method of claim 9, wherein the radio node communicates using a single carrier frequency and, at a given time, the radio node transmits frames using one of the first channel and the second channel; and wherein the uninterrupted communication involves a third handover from the first channel to the second channel.

19. The method of claim 9, wherein the radio node communicates using multiple carrier frequencies and the radio node simultaneously transmits frames using the first channel and the second channel.

20. The method of claim 9, wherein the first channel and the second channel are as far apart as is possible in the unallocated channels.

* * * * *